(12) United States Patent  (10) Patent No.: US 8,398,807 B2
Handwerker  (45) Date of Patent: Mar. 19, 2013

(54) CONCRETE CURE BLANKET HAVING REFLECTIVE BUBBLE LAYER AND METHOD OF MANUFACTURING

(75) Inventor: Gary Handwerker, Northfield, IL (US)

(73) Assignee: Midwest Canvas Corporation, Chicago, IL (US)

( * ) Notice: Subject to any disclaimer, the term of this patent is extended or adjusted under 35 U.S.C. 154(b) by 0 days.

(21) Appl. No.: 12/905,570

(22) Filed: Oct. 15, 2010

(65) Prior Publication Data

US 2011/0139349 A1    Jun. 16, 2011

Related U.S. Application Data

(60) Continuation of application No. 12/329,312, filed on Dec. 5, 2008, now Pat. No. 7,815,991, which is a division of application No. 10/079,192, filed on Feb. 19, 2002, now Pat. No. 7,465,484.

(51) Int. Cl.
| | |
|---|---|
| *A63B 39/00* | (2006.01) |
| *A63B 41/00* | (2006.01) |
| *B29C 65/00* | (2006.01) |
| *B32B 37/00* | (2006.01) |
| *B31F 1/20* | (2006.01) |
| *C08J 5/00* | (2006.01) |

(52) U.S. Cl. ...... 156/292; 156/147; 156/210; 156/308.4

(58) Field of Classification Search ............... 156/145, 156/146, 147, 182, 210, 278, 279, 292, 308.2, 156/308.4, 313; 428/68, 72, 76; 52/506.01
See application file for complete search history.

(56) References Cited

U.S. PATENT DOCUMENTS

| | | | | |
|---|---|---|---|---|
| 3,072,920 | A | 1/1963 | Yellott | 4/172 |
| 3,142,599 | A | 7/1964 | Chavannes | 156/210 |
| 3,420,022 | A | 1/1969 | Brock | 52/302 |
| 3,577,305 | A * | 5/1971 | Hines et al. | 428/72 |
| 3,604,324 | A | 9/1971 | Middlestadt | 94/39 |
| 3,619,340 | A | 11/1971 | Jones | 161/127 |
| 3,676,641 | A | 7/1972 | Olson | 219/200 |
| 4,028,750 | A | 6/1977 | Gustafsson | 4/172.12 |
| 4,038,447 | A * | 7/1977 | Brock | 428/72 |
| 4,117,641 | A | 10/1978 | Wells | 52/404 |
| 4,304,824 | A | 12/1981 | Karpinski | 428/69 |
| 4,313,993 | A | 2/1982 | McGlory | 428/178 |
| 4,315,962 | A | 2/1982 | Skoien | 428/12 |
| 4,396,454 | A | 8/1983 | Brys et al. | 156/494 |
| 4,401,707 | A | 8/1983 | Bailey et al. | 428/166 |
| 4,420,521 | A | 12/1983 | Carr | 428/74 |
| 4,485,137 | A * | 11/1984 | White | 428/57 |
| 4,533,583 | A * | 8/1985 | May | 428/69 |
| 4,535,828 | A | 8/1985 | Brockhaus | 160/84 |
| 4,544,600 | A | 10/1985 | Kern | 428/323 |
| 4,549,323 | A | 10/1985 | Brockhaus | 5/455 |

(Continued)

FOREIGN PATENT DOCUMENTS

WO    WO 98/10216    3/1998

*Primary Examiner* — Philip Tucker
*Assistant Examiner* — Brian R Slawski
(74) *Attorney, Agent, or Firm* — J. Peter Paredes; Rosenbaum IP

(57) ABSTRACT

A method of manufacturing a lightweight multilayer heat reflective concrete cure blanket having a moisture-impervious top outer layer, a moisture-impervious bottom outer layer, and the top and bottom layers sealingly connected to each other at the boundaries of the layers to form a moisture-impervious chamber between the first and second layers. The chamber includes at least one bubble type insulative layer therein, and the bottom surface of the blanket comprises a heat reflective material to reflect heat emanating from the concrete when the blanket is placed over the concrete. In a further embodiment, heat reflective material is applied to at least one inner bubble type layer to reflect additional heat which radiates from the concrete through the insulative layer and back towards the concrete.

11 Claims, 2 Drawing Sheets

U.S. PATENT DOCUMENTS

| | | | |
|---|---|---|---|
| 4,579,756 A | 4/1986 | Edgel | 428/34 |
| 4,709,688 A | 12/1987 | Paradis | 126/415 |
| 4,945,924 A | 8/1990 | Poettgen | 128/849 |
| 4,961,238 A | 10/1990 | Limb et al. | 5/500 |
| 5,011,743 A | 4/1991 | Sheridan et al. | 428/600 |
| 5,072,455 A | 12/1991 | St. Ours | 2/81 |
| 5,224,832 A | 7/1993 | Gonczy et al. | 112/262.1 |
| 5,281,458 A | 1/1994 | Adams | 428/100 |
| 5,304,408 A | 4/1994 | Jarosz et al. | 428/75 |
| 5,345,621 A | 9/1994 | Livingston | 4/541.1 |
| 5,549,956 A | 8/1996 | Handwerker | 428/73 |
| 5,792,539 A | 8/1998 | Hunter | 428/72 |
| 5,855,978 A * | 1/1999 | Handwerker | 428/57 |
| 5,874,150 A * | 2/1999 | Handwerker | 428/102 |
| 6,248,433 B1 | 6/2001 | Aanestad | 428/304.4 |
| 6,286,155 B1 | 9/2001 | Handwerker | 4/498 |
| 2001/0025388 A1* | 10/2001 | Handwerker | 4/498 |
| 2003/0124315 A1* | 7/2003 | Grochoski | 428/180 |

* cited by examiner

CONCRETE CURE BLANKET HAVING REFLECTIVE BUBBLE LAYER AND METHOD OF MANUFACTURING

CROSS-RELATED APPLICATIONS

The present application is a continuation and claims priority from U.S. application Ser. No. 12/329,312, filed Dec. 5, 2008, now U.S. Pat. No. 7,815,991, which is a divisional from U.S. application Ser. No. 10/079,192, filed Feb. 19, 2002, now U.S. Pat. No. 7,465,484, all herein incorporated by reference in their entirety.

BACKGROUND OF THE INVENTION

This invention relates to blankets for curing concrete and the like, and more particularly to a lightweight concrete cure blanket.

One of the usual requirements in producing quality concrete is the proper manipulation of the concrete during curing. Curing not only increases the strength of concrete and its structural value, but proper curing during the curing period is mandatory for the production of water-tight and durable concrete. During the concrete curing process, chemical changes occur in the presence of water which ensures that the hardened concrete will be water-tight and durable over time, resulting in a stable and sturdy cured physical structure. These chemical changes occur over a considerable period of time requiring that the concrete be kept wet after it has set during the curing period. However, one problem is that the heat radiating from the concrete during the curing process evaporates the moisture in the concrete, thereby inhibiting the chemical hardening process and compromising the strength and durability of the cured concrete.

It is therefore necessary to contain the heat and moisture in the concrete long enough to permit the curing process to be sufficiently completed. Not surprisingly, the need for heat and moisture retention increases during cold weather applications. With decreasing temperatures, the need for increased thermal retention requires the use of additional layers of insulation, resulting in concrete cure blankets of greater thickness which are heavy and cumbersome to use. It would be advantageous to have a lightweight multilayer moisture-impervious heat reflective concrete cure blanket that is capable of providing enhanced thermal resistance without a corresponding increase in the thickness or weight of the blanket.

Conventional moisture-impervious concrete cure blankets use combination foam, Fiberglass, air filled bubble layers, and like materials as insulative layers. However, such blankets are susceptive to accidental rips, and in the event the interior insulation gets wet, the insulating quality of the insulation material is reduced. Another method to keep the curing concrete moist utilizes frequent sprinklings, but this approach is labor intensive and expensive. To promote curing, horizontal concrete surfaces are usually covered by sand, canvas or burlap to maintain the desired dampness. But irregular and/or vertical concrete surfaces cannot be adequately covered and have to be sprinkled periodically to maintain the required damp condition. Concrete cure blankets are typically used to cover water-wetted concrete to extend the duration of the damp condition for as long as possible. It would be advantageous in the art to have a lightweight and durable, multilayer, moisture-impervious, heat reflective concrete cure blanket having enhanced thermal resistance and which is also universal in use in that it can be used for curing either horizontal or vertical concrete structures regardless of size. It would also be advantageous to provide a lightweight and durable heat reflective concrete cure blanket which is inexpensive to produce, and may be discarded after use.

One prior art attempt to solve these problems is taught by U.S. Pat. No. 5,549,956 to Handwerker, the present inventor, titled "Heat Reflective Blanket" which is directed to a flexible, multilayer heat reflective blanket containing at least one interior heat reflective, (i.e., metal foil) layer, and at least one interior insulative layer. It has been discovered that a heat reflective concrete cure blanket configured to include an insulative layer as well as a heat reflective layer improves and enhances the effectiveness of the blanket, thereby making the blanket more efficient for its intended use. While the blanket disclosed in U.S. Pat. No. 5,549,956 satisfactorily enhances the concrete curing process; the configuration of this type of concrete cure blanket is somewhat expensive. It would be an advantage in the art if a lightweight, multilayer, moisture-impervious, heat reflective concrete cure blanket could be manufactured inexpensively, and yet also be durable and long-lasting.

Another approach to solve the above problems is taught by U.S. Pat. No. 4,485,137 to White titled "Concrete Curing Blanket" which is directed to a lightweight summer concrete cure blanket which improves water retention in the curing concrete irrespective of the surface irregularities present in the concrete. The cure blanket provides for effective water wicking or capillary wetting action characteristics across the entire blanket. The concrete cure blanket can be easily sealed with adjacent blankets to provide continuous coverage of a large area of curing concrete without tearing the blankets. The White concrete cure blanket has a nonporous surface layer of a low density polyethylene that is heat sealed as a coating upon a batting layer of a porous, resilient, non-woven, needle-punched, synthetic fabric such as polypropylene or commercially available polymeric filament fabric. While having a porous exterior surface layer, the opaque surface layer of this concrete cure blanket will block visible sunlight and UV radiation. However, this concrete cure blanket is not suitable for winter concrete curing utilization, since the prior art blanket cannot reflect the heat radiating from the curing concrete, and the evaporation of moisture from the curing concrete remains a continuous operational problem thereby requiring rewetting of the curing concrete from time to time as needed during the curing period. It would be an advantage in the art if a lightweight, multilayer, moisture-impervious heat reflective concrete cure blanket were available to the construction industry.

Yet another attempt to provide an efficient concrete curing blanket is shown in U.S. Pat. No. 5,855,978, to Handwerker, the present inventor, which describes a concrete cure blanket having top and bottom moisture-impervious outer layers, at least one heat insulative layer disposed between the top and bottom layers, the bottom outer layer composed of a woven material with a heat reflective material applied to the lower surface of the woven material. The disclosed concrete cure blanket of this prior art patent includes a woven polyethylene layer having added reflective material applied to the outer facing surface of the lower outer layer. This differs from the present invention, which does not incorporate a woven polyethylene layer and an additional reflective layer, which provides a blanket of less weight and manufacturing costs than shown in Handwerker U.S. Pat. No. 5,855,978.

The initial costs associated with the production of various concrete cure blankets disclosed in the prior art make such blankets expensive to acquire. It would be an advantage in the art if a lightweight, multilayer, moisture-impervious, heat reflective concrete cure blanket could be manufactured relatively inexpensively and easy to maintain, or even disposable, by utilizing long-lasting thermoplastic films formed into at least one bubble type structure having a relatively small thickness and weight, in combination with reflective materials.

The present invention overcomes these and other problems that are inherent in existing multilayer and other concrete cure blankets.

SUMMARY OF THE INVENTION

The present invention is a method of manufacturing a lightweight moisture-impervious, film-like outer layers formed with at least one bubble type insulative layer, and at least one heat reflective layer associated with one or both of the outer layers and/or bubble type layers to reflect heat back to the concrete, thereby reflecting heat emanating from the concrete back to the concrete to maintain heat in the concrete.

A principal object of the present invention is to provide and manufacture a lightweight bubble type multilayer moisture-impervious heat reflecting concrete cure blanket that exhibits enhanced thermal reflective capability without a corresponding increase in the thickness and/or weight of the blanket.

Another object of the present invention is to provide and manufacture a lightweight bubble type multilayer moisture-impervious heat reflecting concrete cure blanket that exhibits enhanced thermal resistance of the blanket by utilizing at least one heat reflective surface embodied as part of a bubble type insulative layer, which surface reflects the heat radiating from curing concrete back toward the concrete.

A further object of the present invention is to provide and manufacture a lightweight bubble type multilayer moisture-impervious heat reflecting concrete cure blanket that exhibits enhanced thermal resistance of the blanket by utilizing at least one heat reflective surface, which surface reflects the heat radiating from curing concrete back toward the concrete, in combination with at least one bubble type insulative layer forming part of the blanket.

A further object of the present invention is to provide and manufacture a lightweight multilayer moisture-impervious heat reflecting concrete cure blanket that exhibits enhanced thermal resistance of the blanket by utilizing a plurality of heat reflective surfaces in combination with at least one bubble type insulative layer that reflects heat radiating from curing concrete back toward the concrete.

A further object of the present invention is to provide and manufacture a lightweight bubble type multilayer moisture-impervious heat reflecting concrete cure blanket that retards the rate of moisture evaporation occurring in the curing concrete by reflecting the heat radiating from the curing concrete back toward the concrete.

A still further object of the present invention is to provide and manufacture a lightweight bubble type multilayer moisture-impervious heat reflecting concrete cure blanket that is easy and inexpensive to manufacture, durable and long-lasting, easy to maintain, and comprises less material and weight than previous concrete cure blankets. Such blanket could be disposable, if desired, due to its inexpensive costs of manufacture.

In accordance with one embodiment of the present invention, there is provided and manufactured a lightweight bubble type multilayer heat reflective concrete cure blanket, the blanket having associated heat reflective elements associated with at least a bottom moisture-impervious layer, the blanket comprising: a moisture-impervious first top outer layer and a moisture-impervious second bottom outer layer, the first and second layers sealingly connected to each other at the boundaries of the layers to form a moisture-impervious chamber between the first and second layers. At least one heat insulative layer is formed with the top outer layer, the heat insulative layer having a plurality of insulative elements disposed in spaced relation to each other on at least one surface of the insulative layer. The second bottom outer layer comprises either a substantially flat non-insulative heat reflective layer, or an insulative heat reflective layer of a plurality of insulative elements disposed in spaced relation to each other. The substantially flat non-insulative layer, and/or the insulative layer of the bottom outer layer has a reflective material applied thereto to reflect heat radiating off of the curing concrete back to the concrete.

These and other objects and advantages of the present invention will be set forth in the following description of the illustrated embodiments in connection with the drawings, the disclosure, and the appended claims, wherein like reference numerals represent like elements throughout.

DETAILED DESCRIPTION OF THE PREFERRED EMBODIMENTS

In accordance with the present invention, a lightweight, bubble type multilayer, heat reflective concrete cure blanket is described that provides distinct advantages when compared to those of the prior art. The invention can best be understood with reference to the accompanying drawing figures.

Figure 1:
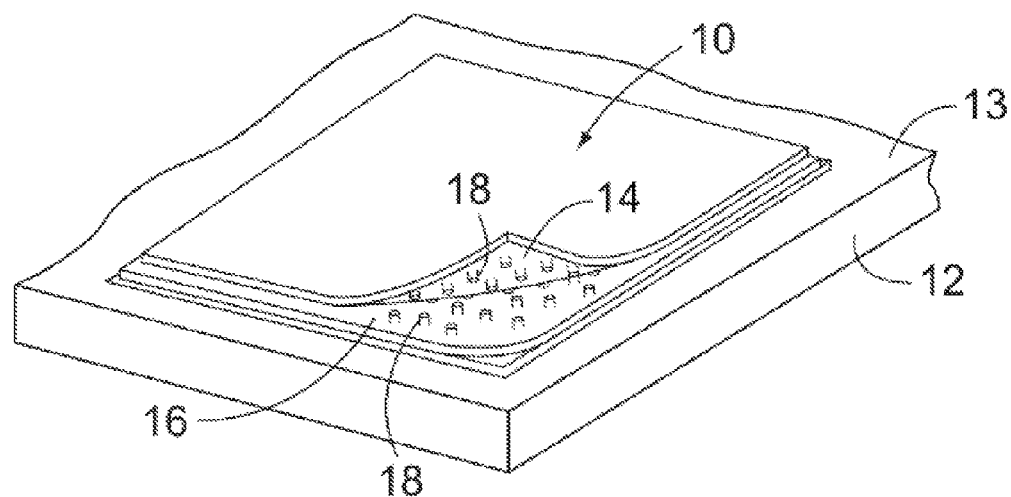
FIG. 1 is a perspective view of one embodiment of the lightweight heat reflective bubble type concrete cure blanket of the present invention, disposed on a horizontal curing concrete slab.

FIG. 1 is a perspective view of one embodiment of a lightweight, multilayer, heat reflective concrete cure blanket 10 constructed in accordance with the present invention and disposed on top of a wet curing concrete structure or slab 12 which is in a curing stage and has an associated surface 13. In FIG. 1, this embodiment of the cure blanket 10, while it may have any shape and size, is customarily fabricated from a plurality of laterally disposed panels suitably fastened together, each panel having a width of approximately 6 feet and a length of several tens of feet (i.e., twenty feet or more). The cure blanket 10 is usually rectangular in shape and possible alternative embodiments include square, circular, or custom designed shapes for specific site applications, and can be conveniently rolled-up for easy handling, transport to different job sites, and storage whenever required. The blanket 10 is lightweight (e.g., about six ounces per square yard without an insulative layer), flexible and pliable, long-lasting and durable. The cure blanket 10 is easy to clean, relatively maintenance free, resists tearing during use, and under expected operating conditions the blanket can be reusable for many years. The present blanket however, also may be manufactured so inexpensively that the blanket may be disposable.

To produce a uniform concrete cure blanket 10, the blanket is manufactured using thermoplastic hot melt extrusion manufacturing practices for polyethylene films and an associated flat film that are common and well understood by those in the thermoplastic industry. The cure blanket 10, as illustrated in FIG. 1, is formed of a moisture-impervious top outer layer 14 and a moisture-impervious bottom outer layer 16. Top outer layer 14 and bottom outer layer 16, in the embodiment illustrated in FIG. 1, each include bubble type layers, constructed from plastic material and having a plurality of air filled, heat absorbing insulative pockets or elements 18, or like insulative elements. Insulative pockets 18, in the embodiment of FIG. 1, extend downward in outer layer 14 from one quarter to one half inch approximately, and extend upward in bottom outer layer 16, also from approximately one quarter to one half inch.

Figure 2:
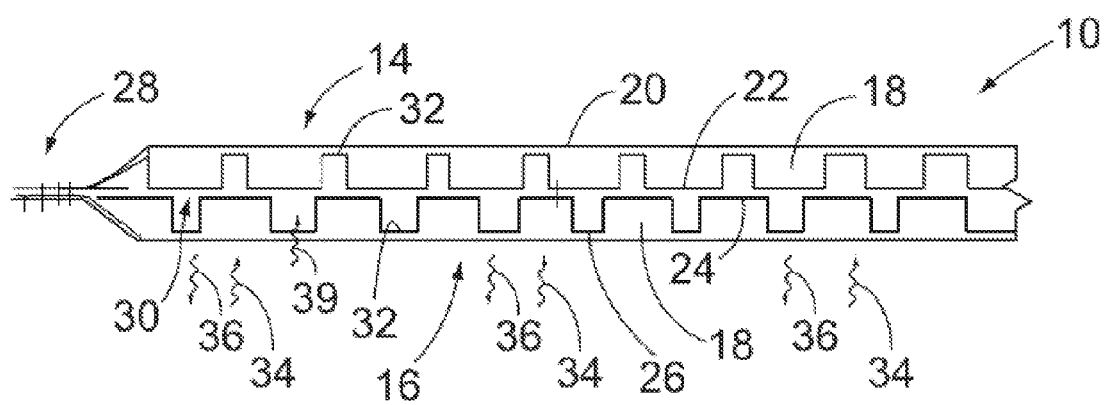
FIG. 2 is a partial cross-sectional schematic view of an embodiment of the present invention having an upper and a lower layer of bubble type insulative elements.

Referring to the embodiment of the invention illustrated in FIGS. 1 and 2, the top outer layer 14 comprises a two-piece structure having a flat film 20 and a film 22 in which insulative pockets 18 are formed, such as by a thermoplastic extrusion process. Flat film 20 and extruded film 22 are heat sealed where the two films come together, forming air filled insulative pockets 18. As seen in FIG. 2, insulative pockets 18 extend substantially downward from upper film 20.

Also referring to the illustrative embodiment of FIGS. 1 and 2, the bottom outer layer 16 comprises a two piece structure having a film 24 in which insulative pockets 18 are formed, such as by a thermoplastic extrusion process, and a flat film 26. Films 24 and 26 are heat sealed where the two films contact each other, forming air filled insulative pockets 18.

Upper film 20 of top outer layer 14 is preferably dark in color to absorb ambient heat. However, upper film 14 may also be clear or a medium color if desired.

In the embodiment illustrated in FIGS. 1 and 2, flat film 26 of bottom outer layer 16 is impregnated or coated with a heat reflective material, such as flecks of aluminum or an aluminum pigmented coating. If desired, film 26 may be impregnated or coated with flecks or pigments of other known heat reflective materials.

In a further embodiment of the invention illustrated in FIGS. 1 & 2, bottom extruded film 24 may also be impregnated or coated with a heat reflective material, such as flecks of aluminum, an aluminum pigmented coating, or other heat reflective flecked material or pigments. Thus, in this embodiment, both bottom film 26 and extruded film 24 comprise heat reflective bottom outer layer 16. An example of a suitable reflective material is available under the product name of Silver, Product No. MT1065F (LDR: 33/1, Resin: LDPR, Carrier 60-65% LDPR) from Color Master, Inc. of Avilla, Ind. 46710.

The outer edges 28, or boundaries, of top outer layer 14 and bottom outer layer 16 of blanket 10 are preferably joined or seamed, as at 28, using conventional methods such as stitching, heat sealing or any other known process that will form a moisture-impervious chamber 30 between top outer layer 14 and bottom outer layer 16. The seaming or sealing 28 is applied along the boundary edges of blanket 10, and/or within the body of the blanket in a suitable and effective pattern. If desired, the peripheral edges of the concrete cure blanket 10 can be provided with a grommet and rope attachment (not shown) for use with vertical, sloping or irregular concrete structures.

In the illustrated embodiments, when the concrete cure blanket 10 is properly used, the bottom outer layer 16 may be in continuous contact with the surface 13 of the wet curing concrete slab 12, or an air space of three inches, or more or less, may exist between bottom outer layer 16 and concrete slab 12. The bottom layer 16 of the cure blanket 10 may have a smooth surface which enables the blanket to remain somewhat slippery when wet and not adhere to the curing concrete 12 nor leave any marks, mars, indentions, or other impressions on the associated concrete surface 13. In addition, the present concrete blanket 10 is designed to be disposed of after one or, at most, a few applications. Therefore, it is not necessary to apply a clear film or coat beneath bottom flat film 26 to protect film 26 from chemicals in the concrete which may tend to deteriorate the blanket 10 after many uses.

The air-filled, heat absorbing insulative pockets 18 may be constructed of any shape or height according to the specifications of the cure blanket 10. In the illustrated embodiments, each air-filled insulative pocket 18 encapsulates a particular volume of air. The air-filled insulative pockets 18 are disposed in a predetermined spaced relation to each other on the surface of extruded films 22 and 24 defining open spaces 32 (FIG. 2) between each pocket 18. Accordingly, the insulative layers 14 and 16 serve a dual purpose along their entire length and width by means of the combination of the insulative air pockets 18 and the open spaces 32, namely to create a heat transfer path allowing heat radiating from the surface of the concrete to pass through open spaces 32, and to constitute an effective insulation barrier as a result of the air-filled pockets 18. Accordingly, the result is that the entirety of insulative layers 14 and 16 function both as an effective insulation barrier to radiant heat loss and as a path to allow reflected heat to be directed back toward the curing concrete 12 after heat enters the chamber. This serves to improve the thermal effectiveness and efficiency of the cure blanket 10 without a corresponding increase in the thickness or weight of the blanket. Additionally, the underside of the blanket 10 provided by flat film 26 provide a fresh, clean blanket for a few additional applications.

In operation, referring to FIG. 2, when the blanket 10 is placed over concrete slab 12, heat emanating from the concrete curing process radiates upward from concrete slab 12 towards reflective film 26 forming the underside of blanket 10, as depicted by arrows 34. A portion of this heat is reflected downward from reflective film 26 of bottom outer layer 16 of blanket 10, as depicted by arrows 36, and this heat is re-applied to the concrete to help maintain the concrete at a warmer temperature had the heat represented by arrows 34 been allowed to evaporate into the atmosphere.

An additional portion of the heat 39 emanating from concrete slab 12 passes through bottom outer layer 16 of blanket 10, and reaches insulative layers 22 and 24. In the embodiment illustrated in FIG. 2, the blanket 10 comprises two insulative layers 22 and 24. However, a plurality of insulative layers may be provided, as will be described below in association with FIG. 3. The heat 39 reaching insulative layers 22 and 24 either passes relatively rapidly through the spaces 32 between air filled insulative pockets 18 or is retained for a longer period of time by means of air filled pockets 18. In the illustrated embodiment, insulative layer 22 is composed of a reflective layer, similar in construction to the reflective embodiment of extruded film 24. A substantial portion of the heat passing to reflective layer 22 is directed downward (arrow 36) towards concrete slab 12. As set forth above, reflective flat film 26 is not covered by a coating of clear polyethylene, or any other material, to take maximum advantage of the reflective quality of the flat film 26. The downwardly reflected heat in chamber 30 passes readily through insulative layer 24 via open spaces 32, and migrates downward through bottom outer layer 16 of blanket 10 until the reflected heat also reaches concrete slab 12.

Figure 3:
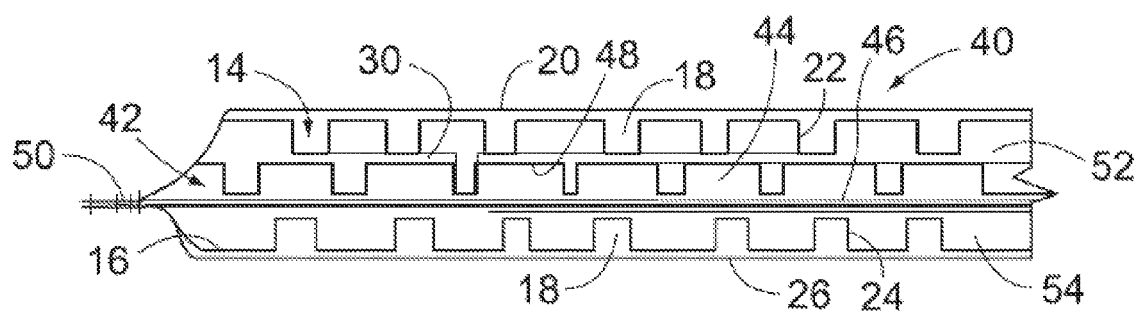
FIG. 3 is a partial cross-sectional schematic view of a further embodiment of the present invention having an upper, intermediate and lower layer of bubble type insulative elements.

Referring to FIG. 3, an additional embodiment of the present invention is illustrated, wherein a concrete cure blanket 40 is shown having an additional insulative layer 42 inserted between top outer layer 14 and bottom outer layer 16. In FIG. 3, like numerals are used to designate corresponding elements illustrated in FIGS. 1 and 2. Top outer layer 14 in FIG. 3 includes insulative elements 18 and a flat upper film 20 which are heat sealed together to form top outer layer 14. In similar fashion, bottom outer layer 16 comprises insulative elements 18, and a flat bottom film 26 heat sealed to insulative elements 18 to form bottom outer layer 16.

In the illustrated embodiment of FIG. 3, upper film 20 may be clear, or may incorporate a dark color to absorb ambient heat. Flat film 26 of bottom outer layer 16 is impregnated or coated with a heat reflective material, such as flecks of aluminum, an aluminum pigmented coating, or other heat reflective flecked material or pigments. In a further embodiment of the invention illustrated in FIG. 3, upper extruded film 22 and/or bottom extruded film 24 may also be impregnated or coated with a heat reflective material, such as mentioned above, and as discussed in relation to the embodiment of FIGS. 1 and 2.

In the embodiment of FIG. 3, additional insulative layer 42 is disposed in the chamber 30 formed between top outer layer 14 and bottom outer layer 16. Insulative layer 42 in the illustrated embodiment is also a bubble type layer, constructed from plastic material and having a plurality of air filled, heat absorbing insulative pockets or elements 44, or like insulative elements. Layer 42 is composed of a two piece structure having a flat film 46 and a film 48 in which insulative pockets 44 are formed, such as by a thermoplastic extrusion process. Flat film 46 and extruded film 48 are heat sealed where to two films abut at their boundaries, forming air filled insulative pockets 44. In the embodiment of FIG. 3, either flat film 46 or extruded film 48, or both layers 46 and 48, may be impregnated or coated with a heat reflective material, as described previously in conjunction with bottom outer layer 16. The outer edges, or boundaries, of top outer layer 14, additional layer 42 and bottom outer layer 16 are preferably joined or seamed, as at 50, using conventional methods such as stitching, heat sealing, or any other known process that will form moisture impervious chambers 52, 54 between the respective layers. If desired, the peripheral edges of concrete cure blanket can be provided with a grommet and rope attachment (not shown) for use with vertical, sloping or irregular concrete structure. It is anticipated that concrete cure blanket 40 can be utilized in the same manner as the blanket 10 illustrated in FIGS. 1 and 2.

Figure 4:
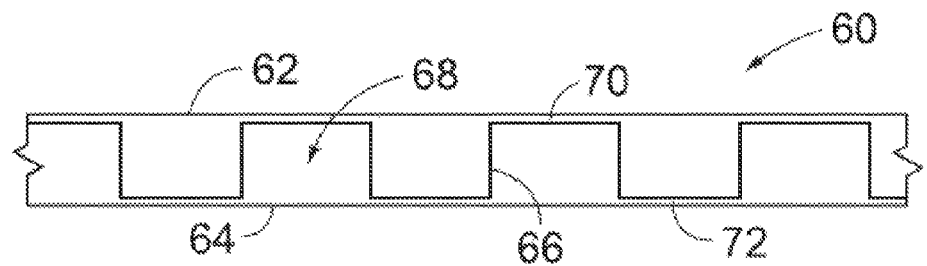
FIG. 4 is a partial cross-sectional schematic view of an additional embodiment of the present invention having a single layer of bubble type insulative elements and a flat bottom reflective layer.

FIG. 4 illustrates a further embodiment of a lightweight, easy to manufacture concrete cure blanket 60 comprising a moisture-impervious flat top layer 62 and a flat bottom moisture-impervious layer 64. Disposed between layers 62 and 64 is a bubble-type layer 66 constructed from plastic material and having a plurality of air-filled, heat absorbing insulative pockets or elements 68. The insulative pockets of layer 66 are formed by known processes, for example such as a thermoplastic extrusion process. Flat films 62 and 64 are heat sealed where each of the flat films come into contact with the extruded film layer 66, as shown at 70 and 72, for example, in FIG. 4.

In the embodiment illustrated in FIG. 4, top layer 62 may be a dark color to absorb ambient heat. If preferred, top layer may be clear or a medium color.

Flat bottom 64 is impregnated or coated with a heat reflective material, such as flecks of aluminum or an aluminum pigmented coating. If desired, flat bottom 64 can be impregnated or coated with flecks or pigments of other known heat reflective materials. Extruded layer 66, in one embodiment of the invention shown in FIG. 4 may also be impregnated or coated with a heat reflective material as described above, or may be a clear plastic material. In the embodiment of FIG. 4, it is also contemplated that the outer edges, or boundaries of the layers comprising blanket 60 (not shown) are joined by stitching, heat sealing or any other known process that will form a moisture impervious structure, as described in conjunction with the embodiments of FIGS. 1-3. If desired, the peripheral edges of concrete cure blanket 60 can be provided with a grommet and rope attachment (not shown) for use with vertical, sloping or irregular concrete structures.

The embodiment of FIG. 4 may be suitable as a disposable concrete cure blanket due to its low cost of manufacture. When used properly, blanket 60 is placed over the concrete such that either bottom layer 64 is in direct contact with curing concrete surface 13 (FIG. 1), or an air space in the range of one to six inches, and usually three inches, may exist between bottom layer 64 and surface 13 of concrete slab 12. Bottom layer 64 of blanket 60 may have a smooth surface which allows the blanket to remain somewhat slippery when wet, and not adhere to the curing concrete 12, nor mar the surface 13 of the concrete when in contact with the concrete.

Although the foregoing detailed description of the present invention has been described by reference to various embodiments, and the best mode contemplated for carrying out the present invention has been herein shown and described, it will be understood that modifications or variations in the structure and arrangement of these embodiments other than those specifically set forth herein may be achieved by those skilled in the art and that such modifications are to be considered as being within the overall scope of the present invention. Therefore, it is contemplated to cover the present invention and any and all modifications, variations, or equivalents that fall within the true spirit and scope of the underlying principles disclosed and claimed herein. Consequently, the scope of the present invention is intended to be limited only by the appended claims.

What is claimed is:

1. A method for manufacturing a lightweight multilayer heat reflective concrete cure blanket, comprising:
   a. forming a first flexible structure having a first outer peripheral edge and comprising a first moisture-impervious outer film and a first flexible undulating film;
   b. heat sealing the first flexible undulating film to the first moisture-impervious outer film to form a plurality of first air-filled insulative pockets and a plurality of first open spaces between the first air-filled pockets;
   c. forming a second flexible structure having a second outer peripheral edge and comprising a second moisture-impervious outer film and a second flexible undulating film;
   d. heat sealing the second flexible undulating film to the second moisture-impervious outer film forming a plurality of second air-filled insulative pockets and a plurality of second open spaces between the second air-filled insulative pockets, wherein the second moisture-impervious outer film includes a plurality of heat reflective elements dispersed throughout the second moisture-impervious outer film; and
   e. sealing the first flexible structure to the second flexible structure about the first and second outer peripheral edges to include a moisture-impervious chamber space formed between the first air-filled insulative pockets and the second air-filled insulative pockets, facing the first open spaces to the second air-filled pockets and facing the second open spaces to the first air-filled pockets while maintaining a gap between the first air-filled pocket and the second air-filled pocket, overlapping the first air-filled pockets with the second air-filled pockets to form a gap between first air-filled pockets and the second air-filled pockets as to communicate in a heat transfer path therebetween, and forming a flexible heat reflective concrete cure blanket.

2. The method of claim 1, further comprising providing a rope attachment device to the peripheral edges of the flexible heat reflective concrete cure blanket.

3. The method of claim 1, further comprising applying a reflective material to the second undulating film.

4. The method of claim 1, further comprising applying a reflective material to the first moisture-impervious outer film.

5. The method of claim 1, wherein the first moisture-impervious outer film is substantially dark in color to absorb ambient heat into the concrete cure blanket.

6. The method of claim 1, further comprising a nonstick smooth substance to the second outer film.

7. A method of manufacturing a lightweight multilayer heat reflective concrete cure blanket, comprising the steps of:
    a. forming a first flexible structure having a first unslitted moisture-impervious outer film and a first flexible undulating film by heat sealing the first flexible undulating film to the first unslitted moisture-impervious outer film to form a first bubble-type insulative layer;
    b. forming a second flexible structure having a second unslitted moisture-impervious outer film and a second flexible undulating film by heat sealing the second flexible undulating film to the second unslitted moisture-impervious outer film to form a second bubble-type insulative layer, and applying a reflective material to the second unslitted moisture-impervious outer film as to reflect heat away from the second flexible structure;
    c. forming the first bubble-type layer having a plurality of first insulative pockets and a plurality of first open spaces between the first insulative pockets, and forming the second bubble-type layer having a plurality of second insulative pockets and a plurality of second open spaces between the second insulative pockets, wherein the first and second insulative pockets alternately face the second and first open spaces, respectively, to form a chamber space between the first and second insulative pockets; and
    d. sealing, in a moisture impervious manner, the first flexible structure to the second flexible structure about the first and second outer peripheral edges, maintaining a gap between the first open spaces and the second open spaces, maintaining a gap between the overlapping first insulative pockets and the second insulative pockets as to communicate in a heat transfer path to form a flexible heat reflective concrete cure blanket.

8. The method of claim 7, further comprising providing a rope attachment device to the peripheral edges of the flexible heat reflective concrete cure blanket.

9. The method of claim 7, further comprising applying a reflective material applied to the second bubble-type insulative layer.

10. The method of claim 7, wherein the second unslitted moisture-impervious outer film is not covered by any material.

11. The method of claim 7, further comprising forming a third flexible structure comprising a third unslitted moisture-impervious film and a second flexible undulating film, and heat sealing the second flexible undulating film to the third unslitted moisture-impervious film to form a third bubble-type insulative layer, and applying a reflective material to the third unslitted moisture-impervious film; and, heat sealing the third flexible structure in between the first flexible structure and the second flexible structure.

* * * * *